(No Model.)
W. WALLACE.
SEWER GAS TRAP AND SINK.
No. 406,979. Patented July 16, 1889.
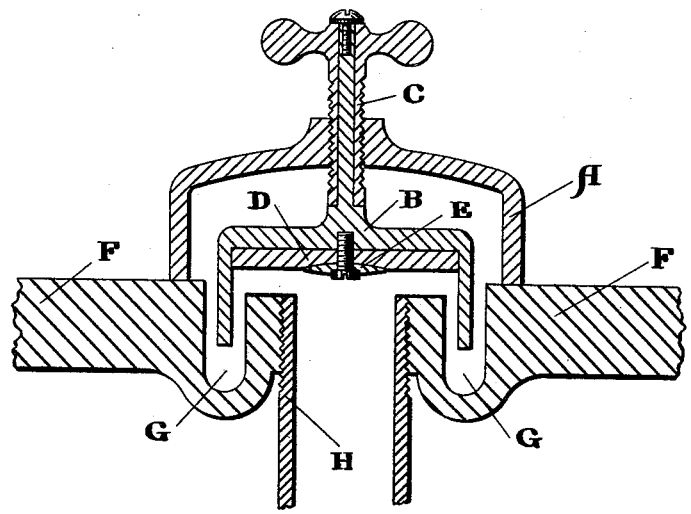
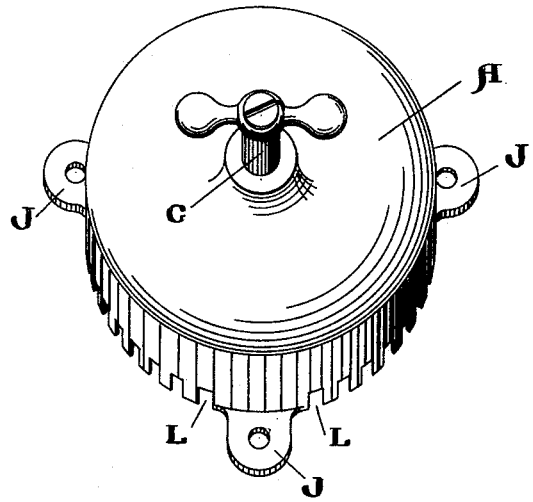
Witnesses:
John L. Prior,
John H. Redstone
Inventor:
William Wallace

UNITED STATES PATENT OFFICE.

WILLIAM WALLACE, OF SAN FRANCISCO, CALIFORNIA, ASSIGNOR TO HIMSELF AND ROBERT C. BRANN, OF SAME PLACE.

SEWER-GAS TRAP AND SINK.

SPECIFICATION forming part of Letters Patent No. 406,979, dated July 16, 1889.

Application filed September 27, 1888. Serial No. 286,533. (No model.)

*To all whom it may concern:*

Be it known that I, WILLIAM WALLACE, a citizen of the United States, residing in the city and county of San Francisco, and State of California, have invented a new and useful Improvement in Combined Sewer-Gas Traps and Sinks, of which the following is a specification.

My invention relates to improvements in combined sewer-gas traps and sinks, of which the following is a specification, reference being had to the accompanying drawings and the letters referring thereto.

Figure 1 is a sectional view showing the sewer-gas excluder, a portion of the sink broken out, and the waste-pipe. Fig. 2 is a perspective view of the excluder.

A represents the valve-supporting frame or shell; B, the screw-piston, stem, and trap-cup; C, the screw-sleeve for raising and lowering the valve; D, the rubber valve-packing; E, the attaching nut and screw for attaching the rubber packing; F, the sink-bottom; G, the trap-groove; H, the waste or discharge pipe; J, the attaching-lugs.

The following is the construction of my improved combined sewer-gas excluder, sink, and trap: I generally form the whole of such castings and packing material as is commonly employed in that class of manufacture. I form the sink-bottom F, when the same is of metal, with the trap-groove G; but when the bottom is of wood I form the groove G in a separate plate and screw it in the same. I form the trap-cup B to operate about in the center of the annular groove G or the trap-groove. I vary the depth of this groove G and the corresponding rim of the trap-cup B to suit the requirement, as will be shown. I do not generally employ the strainer in the top of the waste-pipe, although it may sometimes be employed. The straining-holes L generally answer all purposes of keeping back the sediment and substances liable to choke the waste-pipe.

One of the principal objects of my invention is to avoid the necessity of a trap below in the waste-pipe, in its connections below, by accomplishing a superior result with the combination of the cup B and groove G.

The following is the operation of my improved combined sewer-gas trap and sink: When it is required to discharge the water from the sink, the sleeve-screw C is operated to open the waste-pipe H by raising the rubber valve or packing D, when the water flows in through the straining-holes L and down into the trap-cup G and over into the waste-pipe H, through which it is discharged. The suction is so great in the pipe H, when running full, that the trap-cup G is kept clean of all sediment. The last portion of the water remains in the groove G at a level above the lower edge of the cup B, thus preventing the escape of gas while the mouth of the pipe H is open. When the water is all drained out of the sink, the rubber valve D is screwed down, tightly closing the same and entirely preventing the escape of sewer-gas.

One advantage of my improved sewer-gas excluder is seen in the fact that no water is required to be left in the pipe at any point where it would be liable to freeze in the winter in cold climates, thus stopping the passage of the water and bursting the pipes, as is liable to occur where the old system of traps is employed.

Having thus described my invention, what I claim, and desire to secure by Letters Patent, is—

In combined sewer-gas excluders and sinks, the combination, with a sink having a groove in its bottom concentric to the discharge-aperture, of the shell A, having its lower edge notched, as shown, to form a strainer, and having a central aperture in its top internally threaded, the trap-cup having a plain vertical stem with its lower edge adapted to enter the groove in the sink-bottom, and the threaded sleeve surrounding the stem of the trap-cup and having a handle portion, substantially as specified.

WILLIAM WALLACE.

Witnesses:
JOHN L. PRIOR,
JOHN H. REDSTONE.